United States Patent Office 3,369,656
Patented Feb. 20, 1968

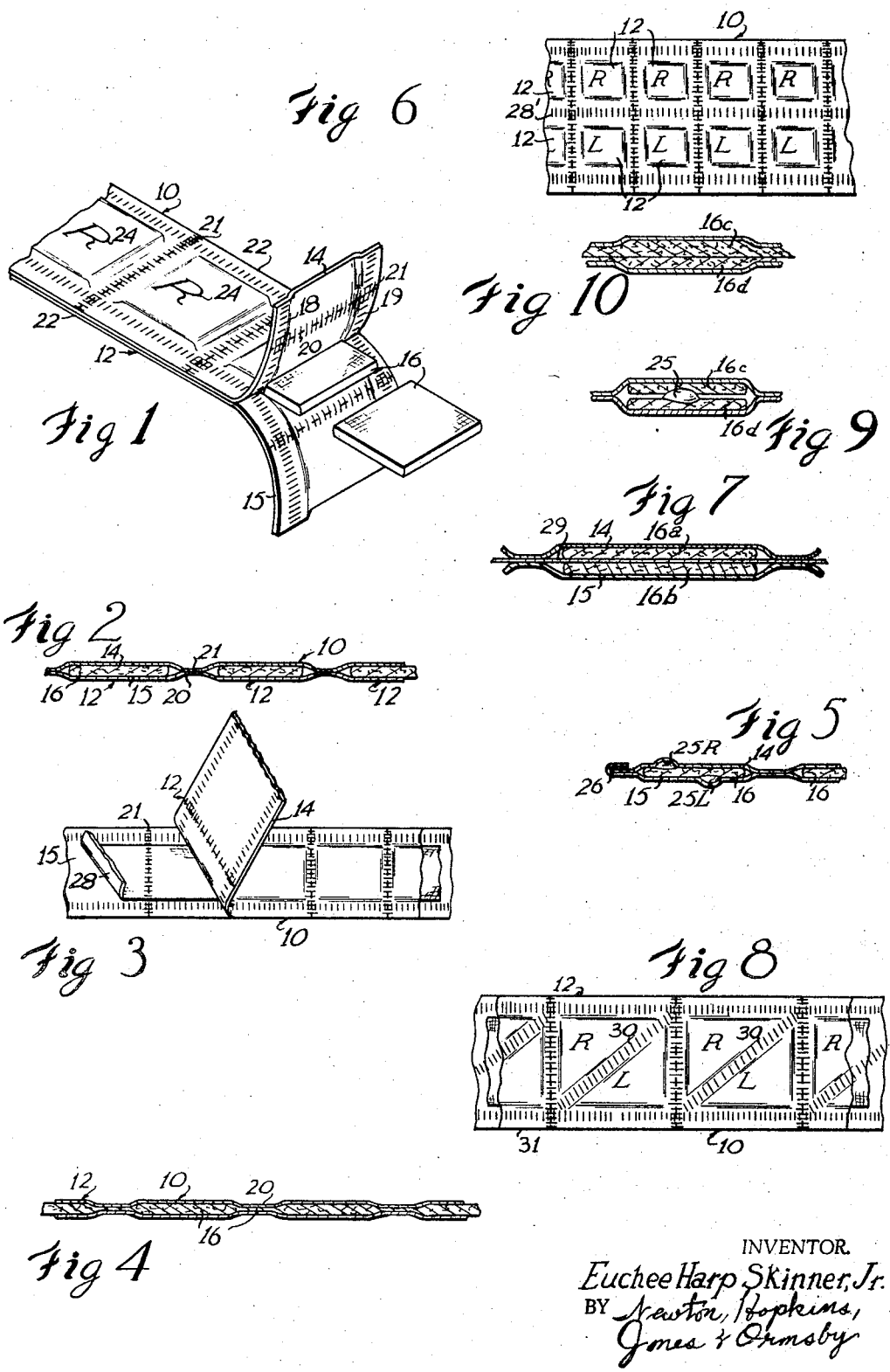

3,369,656
CONTACT LENS CONTAINER
Euchee Harp Skinner, Jr., 3103 Cloverhurst Drive,
East Point, Ga. 30044
Continuation of application Ser. No. 518,423, Jan. 3,
1966. This application Dec. 22, 1966, Ser. No.
604,065
6 Claims. (Cl. 206—56)

ABSTRACT OF THE DISCLOSURE

A flexible, disposable lens container utilized for storing contact lenses of the type worn adjacent the pupil of the human eyeball. The container is fabricated with a pair of external, flexible, liquid impervious sheets, and a soft internal fabric soaked with a solution suitable for treating contact lenses. The external sheets are larger than the internal fabric and sealed to each other about the periphery of the fabric.

Background of the invention

This application is a continuation of application Ser. No. 518,423, filed Jan. 3, 1966, now abandoned.

When placing contact lenses in their position over the pupil of the human eyeball, it has been found desirable to have the lenses substantially germ-free to inhibit diseases of the eye and to have the lens slightly moist so that it will adhere to the eyeball without scraping or damaging the tissues of the eyeball. An antiseptic is required to treat the lenses to render them germ free and lubricants and/or wetting agents are required to moisten the lenses in preparation of placing the lenses against the eyeballs. Because of the several substances normally used in treating the lenses, and because the lenses must be removed from time to time to rest the eyes, containers usually must be provided for the lenses and separate containers must be provided for the particular fluids to be applied to the lenses. Of course, the requirement of the several containers in the proper use of contact lenses is somewhat inconvenient and cumbersome and, accordingly, makes the use of contact lenses not as desirable as they would be without the several containers.

Summary of the invention

Accordingly, this invention comprises a single convenient disposable container for storing and treating contact lenses, the container being flat so that it is easily and conveniently stored in a pocket, the container also being inexpensive so that it can be discarded after use, if desired.

Thus, it is an object of this invention to provide a container for storing small articles.

Another object of this invention is to provide an inexpensive container for storing contact lenses, wherein the container can be discarded after use.

Another object of this invention is to provide a series of disposable containers for storing contact lenses wherein the containers are removably attached to each other.

Another object of this invention is to provide a single flexible container for storing two contact lenses therein.

Another object of this invention is to provide a plurality of disposable containers attached to each other in series whereby one or several of the containers can be detached from the remaining containers to be utilized at a remote point, or the endmost container can be utilized while still being attached to the remaining containers.

Other objects, features and advantages of the present invention will become apparent upon reading the following specification, taken in conjunction with the accompanying drawing, in which:

Brief description of the drawing

FIG. 1 shows a perspective view of a series of containers attached to each other, some of the containers being shown in an exploded view.

FIG. 2 shows an elevational view, in cross-section, of the containers of FIG. 1.

FIG. 3 is an exploded view of a modified form of the invention.

FIG. 4 is an elevational view, in cross-section, of the containers shown in FIG. 3.

FIG. 5 is an elevational view, in cross-section, of the disposition of the containers when the endmost container is in use.

FIG. 6 is a plan view of a modified form of the invention.

FIG. 7 is an elevational view, in cross-section, of a modified form of the invention.

FIG. 8 is a plan view of a modified form of the invention.

FIG. 9 is an elevational view, in cross-section of a modified form of the invention.

FIG. 10 is an elevational view, in cross-section, of another modified form of the invention.

Description of the embodiment

Referring now more particularly to the drawing in which like numerals indicate like parts throughout the several views, FIG. 1 shows an elongate strip 10 of materials out of which a series of containers 12 are formed. The elongate strip 10 comprises outer coverings 14 and 15 which are formed of a liquid impervious flexible material, such as aluminum foil. Absorbent material such as cotton pads 16 are disposed at predetermined intervals along the strip, intermediate the outer coverings 14 and 15. The outer coverings 14 and 15 are joined together along their edges by the corrugations 18 and 19 and between the absorbent pads by corrugations 20. Of course, the corrugations 18–20 tend to force the outer coverings 14 and 15 together in a fluid-tight seal so that the absorbent pads 16 are isolated from the atmosphere. The elongate strip 10 is serrated at 21 over the corrugations 20 so that the container 12 can be torn from the elongate strip 10 as desired. Of course, since the corrugations 20 extend over the serrations 21, the tearing of one container 12 away from the elongate strip 10 will not unseal the next adjacent container 12 remaining on the strip 10, nor the container 12 removed from the strip 10.

The corrugations 18 and 19 disposed along the edge of the elongated strip 10 are spaced slightly inwardly of the peripheries 22 so that the outer coverings 14 and 15 appear as separate pieces of material along the periphery of the strip 10. This facilitates the opening of the container. The separate pieces of material being grasped and pulled part to break the seal of the container.

The absorbent pads 16 are soaked with a liquid utilized to treat contact lenses, such as a weak saline soaking solution, antiseptic solution, or lubricant, or a combination of these solutions. Of course, since the outer coverings 14 and 15 are sealed to each other by the corrugations 18–20, the moisture present in the absorbent pads 16 will not be lost to the atmosphere due to evaporation.

The containers 12 of FIG. 1 have their outer coverings 14 and 15 marked with a letter 24 for identification of the lens that is to be placed in the container. For instance, the outer covering 14 could be marked with the letter R to designate the lens worn in the right eye, while the outer covering 15 could be marked with the letter L to designate the lens worn in the left eye. With this arrangement, when a person wanted to store his contact lenses in one of the containers 12 on the strip 10, a container 12 could be removed from the elongate strip 10 by tearing along the serrated portions 21 between the last container 12 and those remaining on the elongate strip 10 so as to remove the container from the strip. The person could then grasp the outer covering 14 with one hand and the opposite outer covering 15 with the other hand along one of the peripheries 22 of the container 12 and pull the outer covering apart along one side of the container. This, of course, would expose the interior portion of the container and its absorbent pad 16 so that the lens 25R normally used in the right eye could be inserted between the absorbent pad 16 and the outer covering 14 that is marked with the letter R and the lens 25L normally worn in the left eye could then be inserted between the absorbent pad 16 and the outer covering 15 which is designated with the letter L, as shown in FIG. 5. The container 12 could then be resealed by pressing the periphery 22 of the outer coverings 14 and 15 together, and folding or creasing with the thumbnail to insure a fluid tight seal.

While the lenses are stored in this manner, the absorbent pad 16 maintains the lenses in a state of readiness so that they can be removed from the container and immediately inserted into the eye. When the lenses are removed from the container, the absorbent pads 16 can be further exposed by further tearing the outer covering 14 away from the outer covering 15, and the absorbent pad can be removed and used to rub the lenses to further clean and moisten the lenses before inserting them into the eyes.

When utilizing the containers 12, it might be desirable to utilize the containers without removing them from the elongated strip 10 so that the lenses 25 might be stored as shown in FIG. 5. It can be seen that the lenses 25R and 25L are placed on opposite sides of the absorbent pad 16 and the outer coverings 14 and 15 folded at 26 and along the sides near the corrugations 18 and 19 (not shown in FIG. 5) to insure an air-tight closure of the container. Of course, when the containers are utilized in this manner there is absolutely no danger of accidentally breaking the seal of the container 12 by inadvertently tearing the outer coverings 14 and 15 by failing to properly tear apart the containers along the serrations 21.

FIG. 3 shows another form of the invention wherein the absorbent pads 16 of FIG. 1 take the form of a continuous absorbent pad 28. Of course, the containers 12 of FIG. 3 can be expediently and economically manufactured since only minimal attention is required to position the continuous absorbent pad 28 between the outer coverings 14 and 15 and the serrations 21 and corrugations 20 between the containers can be positioned on the strip without regard to the spacing of individual pads. Of course, the serrations 21 of the elongate strip 10 of containers 12 of FIG. 3 must be more complete, that is the serrations must be longer and closer together and extend through the continuous pad 28 so that only a small amount of material remains between the containers 12 and they can be easily separated from each other without damaging the strip 10.

As shown in FIG. 4, when the elongate strip 10 is manufactured with a single elongate absorbent pad 16, the intervals at which the strip 10 is pressed so as to form corrugations 20 also substantially corrugates the pad 16 in this area. This pressing effect tends to squeeze some of the liquid present in the pad 16 out of the area beneath the corrugations 20 so that when the next adjacent container 12 is removed from the strip 10, that portion of the absorbent pad 16 that is exposed to the atmosphere will be substantially squeezed free of its liquid so that the strip and the container removed therefrom will not feel wet or moist and will not function to drain the liquid from the interior portion of the pad 16 due to capillary or wicking action.

Referring to FIG. 6, it is desirable in some instances to construct the elongated strip 10 into two rows of absorbent pads 16; one of the rows being designated with the letter L for storage of the lens normally worn in the left eye, and the other row being labelled with the letter R for storage of the lens normally worn in the right eye. With this arrangement, there is small possibility of the lenses becoming mixed, as there might be in a single container. Of course, the strip 10 of FIG. 6 is corrugated and serrated in the same manner as that shown in FIGS. 1–5, plus an extra corrugation 28' is located centrally of the strip 10 and runs longitudinally thereof so as to separate the right and left containers from each other.

As an alternate arrangement to that shown in FIG. 6, the double arrangement of absorbent pads can have the soaking solution on one of the pads and an antiseptic solution on its adjacent pad so that the lenses may both be inserted into one of the containers for storage and be in contact with the antiseptic solution, and just before insertion into the eyes, the adjacent container can be opened and the pad containing the soaking solution removed so that the lenses can be wiped with the soaking solution. Of course, in this instance the container would be marked with appropriate letters to designate the particular solution contained in each of the containers of a pair of containers.

Also, as an alternate arrangement to the configuration of FIG. 1, FIG. 7 shows the use of a pair of pads in a single container. Between the outer coverings 14 and 15 is located a divider 29 and a pair of absorbent pads 16a and 16b. The divider 29 is a continuous strip of liquid impervious material, similar to that of the outer coverings 14 and 15, which separates the absorbent pads 16a and 16b from each other. With this arrangement, the absorbent pads 16a can be impregnated with the soaking solution while the absorbent pads 16b can be impregnated with an antiseptic solution. When using the container, the lenses would be inserted on alternate sides of the antiseptic pad for storage and then the seal to the side of the container containing the soaking solution would be broken so that its pad could be exposed or removed to rub the lenses with the soaking solution before insertion of the lenses into the eyes.

Still yet another form of the invention is shown in FIG. 8 wherein the elongate strip 10 as shown in FIG. 1 has a corrugation 30 disposed diagonally thereacross so as to divide the container 12 into the two sections appropriately marked for storage of the lenses. With this arrangement, the corner 31 of the container 12 would be peeled back to expose both sections of the container simultaneously, whereupon the lenses would be inserted into their respective spaces and the package sealed by folding over the edge of the container as shown in FIG. 5.

FIGS. 9 and 10 show another arrangement where two pads 16c and 16d are enclosed in the container without a divider disposed therebetween. The pads 16c and 16d are both impregnated with the same solution, such as a combination soaking and antiseptic solution. As is shown in FIG. 9, the lens 25 is placed between the pads which offers the lens a maximum amount of protection. When the lens is removed to be placed in the eye, the container can be completely opened to fully expose the pads 16c and 16d so that they can be removed to rub the lens clean and apply more moisture to the lens.

While several embodiments of the invention have been disclosed, it should be understood that a single liquid impregnated pad or a plurality of pads can be positioned between the outer coverings of the elongate strip; a single pad being treated on one side with a particular substance and on the opposite side with a second substance; or when more than one pad is located between the outer covering, one pad can contain another substance. Also, various arrangements can be had for designating particular sections or portions of the container for particular lenses.

Furthermore, while the outer coverings 14 and 15 have been disclosed as being constructed of aluminum foil, it should be understood that the outer coverings can be composed of various other substances, including but not limited to: polyethylene sheets, tinfoil, plastic treated material, cellophane, or any materials coated to prevent vapor loss from the pads contained within the coverings. Also, the coverings can be made of unlike substances. For instance, one cover can be made from a rather stiff material while the opposite covering can be made from a thin flexible material.

Also, while the outer coverings have been disclosed as corrugated to seal their edges, it should be understood that the edges could be attached to each other by other means, including but not limited to: heat sealing, folding, glue, gummed material, or adhesive tape.

Also, while the elongate strip 10 has been disclosed as being serrated at predetermined intervals along its length so that the containers can be easily separated from each other, it should be understood that the elongated strip 10 could be weakened by means other than serrations, including but not limited to: forming the elongate strip with weakened areas at predetermined intervals therealong, by partially cutting one of the outer coverings, by prefolding the outer covering to crease the same and give the strip a tendency to naturally tear along the creases, or the strip 10 may merely be separated in predetermined lengths by cutting the same with scissors, or the like.

Furthermore, while the different sections of the containers have been designated with letters such as R and L to indicate right and left, it should be understood that these sections could also be marked with a color code or other indicating means to designate which lens is stored in which section, or which substance such as soaking substance or antiseptic substance is located in which sections of the container.

Also, while the present invention has been described as being a container specifically construed to house contact lenses, it should be understood that the invention should not be limited to the storage of contact lenses but can be used to store delicate industrial equipment that needs constant lubrication, that might easily be otherwise lost and yet needs to be easily accessible to the person using the same.

It will be obvious to those skilled in the art that many variations may be made in the embodiments chosen for the purpose of illustrating the present invention without departing from the scope thereof as defined by the appended claims.

What is claimed as invention is:

1. A storage article comprising two sheets of liquid impervious flexible material, an absorbent cloth at least partially saturated with a lens coating liquid disposed between said sheets of material, said sheets of material being larger in length and width than said cloth and positioned to overlap said cloth about its edges, a frangible lens positioned between said sheets of material adjacent said cloth, and said sheets of material being connected to each other about the perimeter of said cloth.

2. The invention of claim 1 wherein said sheets of material define sealing corrugations inwardly of their edges and outwardly of the edges of said cloth, leaving a small unsealed portion outwardly of said corrugations.

3. A storage article as set forth in claim 1 wherein its sheets of material are attached to similar sheets of material of a container in a series of similar containers.

4. A storage article as set forth in claim 3 wherein said sheets of material and said absorbent cloth are continuous strips of material forming a strip of containers; said strip of containers being serrated at intervals therealong.

5. The invention of claim 1 and further including an inner liquid impervious material disposed between the sheets of material, said liquid impervious material dividing said absorbent cloth into two portions, the first of which is impregnated with a first contact lens coating substance and the second of which is impregnated with a second contact lens coating substance.

6. A storage article comprising two strips of flexible liquid impervious material in face-to-face juxtapositon, at least one sheet of absorbent material at least partially saturated with a lens coating liquid disposed between said strips of material, said strips of material being larger in width than the absorbent material and positioned to overlap opposite edges of the absorbent material, a frangible lens positioned between the strips of material adjacent the absorbent material, and said strips of material being connected to each other about at least a portion of the perimeter of the absorbent material.

References Cited

UNITED STATES PATENTS

| | | | |
|---|---|---|---|
| 1,438,305 | 12/1922 | Guice | 206—16 |
| 1,588,417 | 6/1926 | Hathaway. | |

JOSEPH R. LECLAIR, *Primary Examiner.*

THERON E. CONDON, *Examiner.*

J. M. CASKIE, *Assistant Examiner.*